Patented Mar. 5, 1946

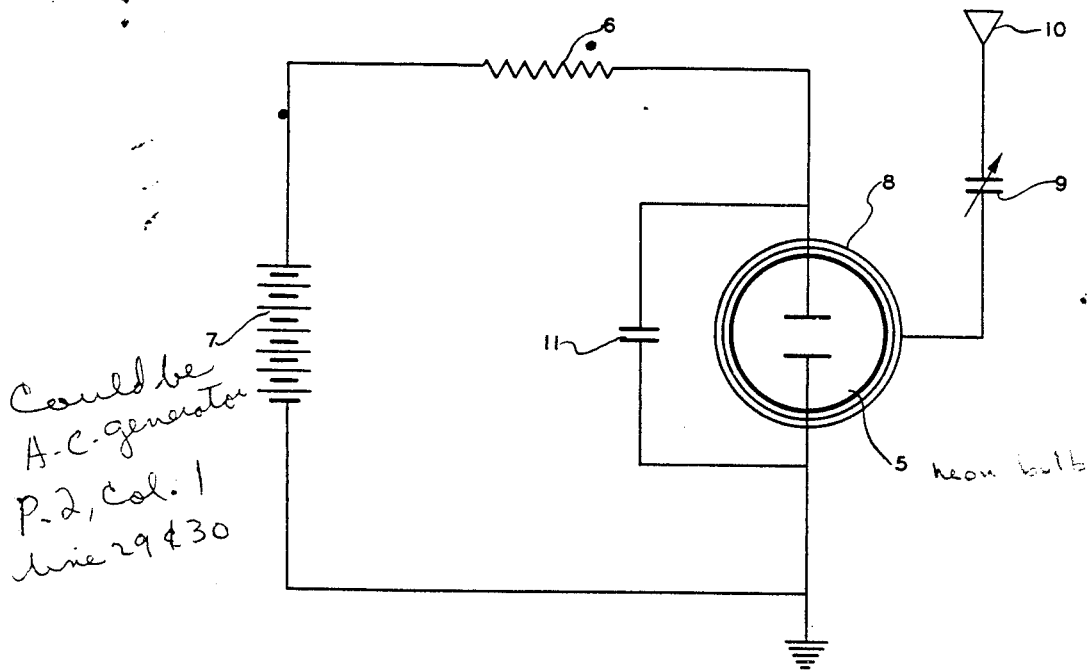

2,395,850

UNITED STATES PATENT OFFICE 2,395,850

MEANS FOR INDICATING THE PRESENCE OF RADIO FREQUENCY FIELDS

George E. Colman, Red Bank, N. J., assignor to the Government of the United States of America as represented by the Secretary of War Application September 18, 1942, Serial No. 562,900

4 Claims. (Cl. 315—176)

(Granted under the act of March 3, 1883, as amended April 30, 1928; 370 O. G. 757)

The invention described herein may be manufactured and used by or for the Government for governmental purposes, without the payment to me of any royalty thereon.

My present invention relates to means for indicating the presence of radio frequency fields and, while not limited thereto, it is particularly well suited to indicating the condition of resonance in radio transmitting and receiving equipment.

In my copending application entitled, "Method and means for measuring radio frequency field intensity," Serial Number 495,730, filed July 22, 1943, I disclose a method and means, for purposes similar to the present invention, which enable the elimination of a thermocouple as a component in the previously used instruments.

In the present invention, I aim to provide a sensitive and accurate device, which not only eliminates the necessity for a thermocouple, but avoids the necessity for an indicating meter as well, thus further reducing cost of manufacture and maintenance, and additionally simplifying the whole procedure of tuning radio equipment, determining modulation, etc.

In general, the present invention consists of the following:

A gas discharge tube, such as a neon bulb, is connected in a D.-C. circuit to bring about the partial ionization of the gas therein. The components of the circuit are such that the D.-C. conductivity thereof remains at a substantially constant level at all times.

The field to be indicated is applied to the tube through electrostatic induction, the radio frequency circuit, of which the tube constitutes a link, being completed by grounding one of the electrodes of the tube. The radio-frequency energy so applied to the tube causes the gas therein to become additionally ionized and the resulting increased glow visibly indicates the intensity of the field.

It is to be particularly noted that in contradistinction to the functioning of the device of my copending application, in which the additional ionization brought about by the R.-F. field causes an increase in the flow of the D. C. and it is the additional D. C. that is made the measure of the field intensity, in the present invention, the additional ionization has practically no effect upon the D.-C. circuit, and the functioning of the device for the intended purpose is dependent solely upon the radio-frequency voltage developed across the tube in the completed R.-F. circuit. The initial, partial ionization of the gas is for the purpose of overcoming the necessity for obtaining a high triggering voltage from the R.-F. field, thereby rendering the tube sensitive to relatively slight increments in the ionization.

In the accompanying specification I describe and in the annexed drawing show one form which the indicators of the present invention may take. It is, however, to be clearly understood that I do not wish to be limited to the construction and circuit herein shown and described for purpose of illustration only, inasmuch as changes therein may be made within the true spirit of the scope of the invention as expressed in the claims hereto appended.

In said drawing, the single figure is a schematic diagram of a radio-frequency field indicating instrument made in accordance with the principles of the present invention.

Referring now more in detail to the present invention, with particular reference to the circuit shown in the drawing, the numeral 5 generally designates a gas discharge tube, such as a neon bulb. Connected in series with the tube 5 is a resistor 6 and a source 7 of D.-C. potential. The value of the D.-C. potential is such as to partially ionize the gas within the tube and cause the same to glow at a low level. The value of the resistor is such as to be very high compared with the resistance of the partially ionized gas, so that changes in the degree of ionization will have practically no effect upon the conductivity of the entire D.-C. circuit and the flow of D. C. will remain at a substantially constant level.

Mounted about the tube 5, in the vicinity of the electrodes thereof, is a conducting ring 8, which is connected, through a variable condenser 9, to a radio-frequency pick-up device, such as an antenna 10. The purpose of the variable condenser is to permit adjustment of the R.-F. energy applied to the tube and avoid overloading. The radio-frequency circuit through the antenna, variable condenser, and tube, is completed by grounding one of the electrodes of the tube as shown, and in order to equalize the degree of ionization, and therefore the glow, in the vicinity of both electrodes under the influence of the radio-frequency field to be indicated, the electrodes are shunted with a low capacitance condenser 11.

As an example of the values of the components of the circuit described, the source of D.-C. potential 7 may be about 100 volts, the gas discharge tube 5 may be a 2 watt neon bulb, the resistor 6 may be from 1 to 5 megohms, the fixed condenser 11 may be about .00025 mmf., and the variable condenser 9 may be of like value at full capacitance.

Upon introducing the pick-up 10 into a radio-frequency field, a difference of potential is established between the conducting ring 8 on the one hand, and the electrodes of the tube 5 on the other, thereby increasing the ionization of the gas in the tube and causing the same to glow at a higher level than before the application of the radio-frequency potential.

There is therefore presented a complete radio-frequency circuit from the pick-up 10 to ground, and inasmuch as the value of the resistor 6 is very high as compared with the resistance of the partially ionized gas of the tube, the additional ionization of said gas, brought about by the radio-frequency potential, alters the conductivity of the D.-C. circuit to such a small extent that it can be said that the D. C. conducted through the tube remains at a substantially constant level. The resulting additional glow of the tube is due solely to the passage therethrough of the radio-frequency current obtained from the radio-frequency field to be indicated.

While throughout this specification, and in the claims, the tube 5 is described as being connected in a D.-C. circuit, this is not to be construed as a limitation; rather, it is illustrative. If desired, the source 7 of D. C. may be replaced with an A.-C. generator.

This completes the description of the present invention. It will be noted from all of the foregoing that I have provided a very simple and inexpensive radio-frequency field indication device which is extremely sensitive, which can be made very rugged, which includes means to prevent overloading, and which enables the elimination of thermocouples and galvanometers, both of which have heretofore been incorporated in instruments designed for purposes similar to those of the present invention.

Other advantages and applications of the present invention will readily occur to those skilled in the art to which the same relates.

I claim:

1. An indicator for oscillating fields comprising a pair of circuits, a glow-discharge tube common to both circuits, one circuit comprising a source of polarizing potential in series with said glow-discharge tube, the potential of said source being just above the striking potential of said glow-discharge tube whereby the latter is partially ionized to produce a glow of relatively low visibility, means in the other circuit responsive to said oscillating fields to vary the resistance of said glow-discharge tube, the resistance of said one circuit being high compared to the resistance of the glow-discharge tube when ionized, whereby a greater range of glow variation is available for indication of said oscillating fields.

2. A radio-frequency field-intensity indicator comprising a first circuit and a second circuit, a glow tube having an ionizable glow-discharge path common to both circuits, a source of potential in said first circuit and in series with said glow-discharge path, said potential being just above the striking voltage of said tube whereby said tube is caused to glow at a relatively low level of visibility, and means to expose said second circuit to electric fields to increase the ionization of said discharge path and thus increase the brightness of said glow as a function of the intensity of said fields, the resistance of said first circuit being relatively high compared to the resistance of said discharge path when fully ionized so as to minimize the changes in current in said first circuit due to ionization changes in said tube brought about by intensity changes in said electric field, whereby a greater range of glow-intensity variation is available for indication of said field-intensity changes.

3. A radio-frequency field-intensity indicator comprising at least a cathode, anode, and control electrode, a glow tube having a circuit including said anode and cathode and a source of potential in series, said potential being just above the striking voltage of said tube, whereby said tube is caused to glow at a relatively low level of visibility, a second circuit including said control electrode and said cathode and responsive to electric fields to increase the ionization of said discharge path and thus increase the brightness of said glow as a function of the intensity of said fields, the resistance of said first circuit being relatively high compared to the average resistance of said glow tube when conducting so as to minimize the changes in current in said first circuit due to ionization changes in said tube brought about by intensity changes in said electric field, whereby a greater range of glow-intensity variation is available for indication of said field-intensity changes.

4. A radio-frequency field-intensity indicator comprising a first circuit and a second circuit, a glow tube having an ionizable glow-discharge path common to both circuits, a source of potential in said first circuit and in series with said glow-discharge path, said potential being just above the striking voltage of said tube, whereby said tube is caused to glow at a relatively low level of visibility, and means to expose said second circuit to electric fields to increase the ionization of said discharge path and thus increase the brightness of said glow as a function of the intensity of said fields, the resistance of said first circuit being relatively high compared to the average resistance of said discharge path when conducting so that the flow of current produced by said potential is maintained at a substantially constant level, whereby a greater range of glow-intensity variation is available for indication of said field-intensity changes.

GEORGE E. COLMAN.

Certificate of Correction

Patent No. 2,395,850.

March 5, 1946.

GEORGE E. COLMAN

It is hereby certified that the above numbered patent was erroneously issued to "the Government of the United States of America, as represented by the Secretary of War" whereas said patent should have been issued to the inventor, said "*Colman*"; and that the said Letters Patent should be read with this correction therein that the same may conform to the record of the case in the Patent Office.

Signed and sealed this 7th day of May, A. D. 1946.

[SEAL]

LESLIE FRAZER,
*First Assistant Commissioner of Patents.*